United States Patent [19]

Horian et al.

[11] 4,155,448
[45] May 22, 1979

[54] RECORD CLEANER

[76] Inventors: Richard C. Horian, 1740 Strickland Dr., Bloomfield Hills, Mich. 48013; James G. Horian, 7340 Indiana, Dearborn, Mich. 48126

[21] Appl. No.: 863,111
[22] Filed: Dec. 22, 1977
[51] Int. Cl.² .................... A46B 9/02; A46B 3/06
[52] U.S. Cl. .................. 206/362; 15/106; 15/114; 15/DIG. 6; 15/184
[58] Field of Search ............ 15/106, 114, DIG. 5, 15/DIG. 6; 206/229, 361, 459; 274/47

[56] References Cited

U.S. PATENT DOCUMENTS

| Re. 12,067 | 12/1902 | Wiens | 15/106 X |
|---|---|---|---|
| 754,900 | 3/1904 | Seith et al. | 15/114 UX |
| 1,083,860 | 1/1914 | Robertson | 15/114 |
| 2,875,460 | 3/1959 | Legge | 15/106 X |
| 3,315,296 | 4/1967 | Richardson | 15/DIG. 5 |
| 3,534,425 | 10/1970 | Watts | 15/160 |
| 3,641,610 | 2/1972 | Lewis, Jr. | 15/114 |
| 3,965,520 | 6/1976 | Maier | 274/47 X |

FOREIGN PATENT DOCUMENTS 2269318  11/1975  France ................... 15/114

*Primary Examiner*—Davis T. Moorhead
*Attorney, Agent, or Firm*—Reising, Ethington, Barnard, Perry & Brooks

[57] ABSTRACT

A phonograph record cleaner having a pair of soft pile covered projections extending downwardly from a cleaner body with a still brush and a soft brush also extending downwardly between the projections. During cleaning of a record, the cleaner is oriented so that the stiffer brush precedes the softer brush, and the pile covered projections properly locate the ends of the brush bristles relative to the record surface. The stiffer bristles are longer than the softer bristles, while the softer bristles of the shorter length are more densely packed than the stiffer bristles. Indicia on the cleaner body allows the cleaner to be hand held and properly oriented during use. Both of the brushes project downwardly through openings in a hollow lower member of the cleaner body and have retainers that limit the downward movement through the openings. An upper member of the cleaner body is snap connected to the lower member as is a retaining member which engages the brushes to limit their upward movement within the openings so as to properly position the brushes. During periods of nonuse, a receptacle mounts the cleaner body with the projections and brushes received within an upwardly opening depression of the receptacle. A cleaning fluid body and an applicator brush are mounted on an end of the receptacle and utilized to apply cleaning fluid to the pile covered projections in order to help in removing static electricity from the record during the cleaning.

14 Claims, 7 Drawing Figures

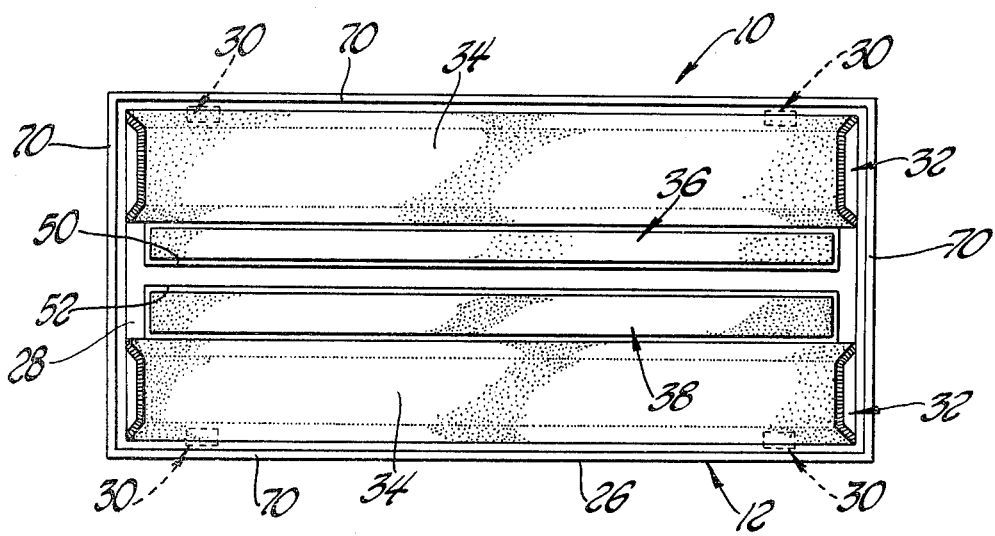
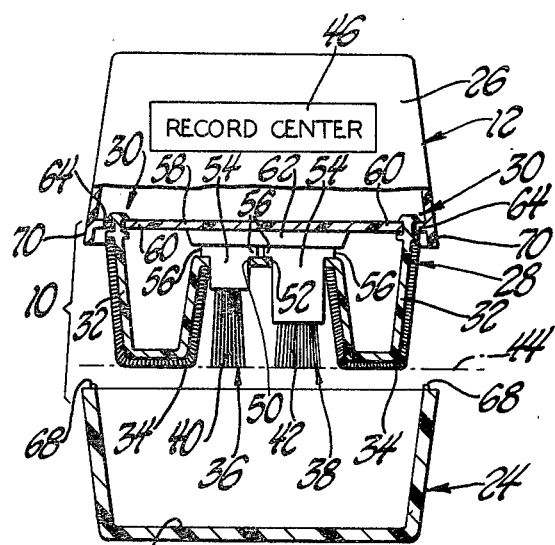
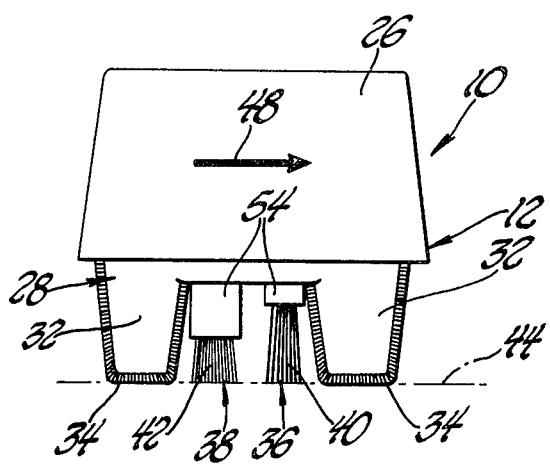
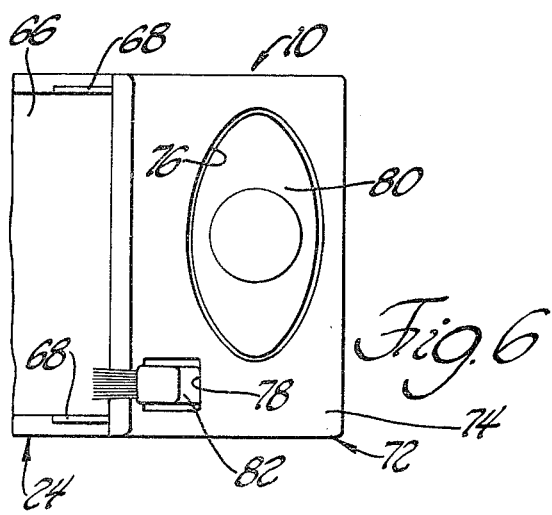
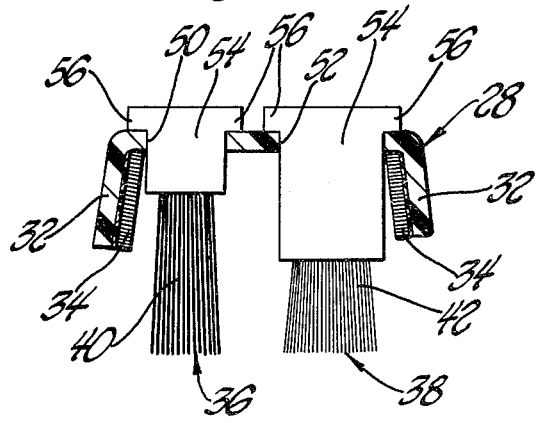

RECORD CLEANER

BACKGROUND OF THE INVENTION

1. Field of the Invention

This invention relates to a phonograph record cleaner for removing dust and accumulation from the grooves of a record.

Our co-pending U.S. patent application Ser. No. 737,295, filed Nov. 1, 1976, discloses a record cleaner in which a single brush is located between a pair of pile covered projections that are slidably engaged with a record during cleaning. The brush loosens dust and accumulation within the record grooves as the cleaner and the record are moved relative to each other.

2. Description of the Prior Art

Prior art patents which disclose phonograph record cleaners include: U.S. Pat. Nos. 2,976,551; 3,229,321; 3,472,517; 3,534,425; and 3,654,660; and West German Auslegeschrift 1,167,055. Other cleaners are disclosed by U.S. Pat. No. 1,957,591; Denmark Pat. No. 71,425; West German Patentschrift 730,595; and Switzerland Patentschrift 348,792.

Brushes and soft pile material have previously been utilized with phonograph record cleaners, as is disclosed by the above cited references. Brushes are usually utilized to break up and remove accumulation and dust particles. Soft pile material likewise is utilized to remove dust and accumulation and can also have cleaning fluid applied to it so that the fluid helps in removing static electrical charge from the record being cleaned.

SUMMARY OF THE INVENTION

An object of the present invention is to provide an improved phonograph record cleaner including a stiff brush and a softer brush projecting downwardly between a pair of soft pile covered cleaning projections so that the brushes cooperatively clean a record as the pile coverings of the projections are slidably engaged with the record.

Another object of the invention is to provide an improved phonograph record cleaner including a stiff brush and a softer brush located between a pair of soft pile covered projections to loosen dust and accumulation in the record grooves as the projections are slidably engaged with the record, and wherein the bristles of the stiffer brush are longer than the bristles of the softer brush while the softer bristles are more densely packed than the stiffer bristles.

A further object of the invention is to provide an improved phonograph record cleaner including a stiff bristled brush and a softer bristled brush located between a pair of soft pile covered cleaning projections and retained in position by snap connections so that the ends of the brush bristles are properly located for cleaning the record grooves as the pile covered projections are slidably engaged with the record surface.

A still further object of the present invention is to provide an improved phonograph record cleaner including a stiff bristled brush and a softer bristled brush mounted between a pair of soft pile covered projections to loosen dust and accumulation from record grooves as the projections are slidably engaged with the record, and further including a receptacle in which the pile covered projections and the brushes are received during periods of nonuse.

In carrying out the above objects and other objects of this invention, a preferred embodiment of the record cleaner includes a cleaning body of an elongated hollow construction having a lower member that defines the cleaning projections and an upper member that is manually grasped to position the cleaner relative to a record to be cleaned. Indicia on the cleaner body indicates the proper orientation of the cleaner during use so that the stiffer bristled brush precedes the softer bristled brush during movement over a record being cleaned to provide the proper cleaning action. At one end of the cleaner body, the indicia includes a first indicator for indicating the location of the record center relative to the cleaner during use with the elongated shape of the cleaner extending radially relative to the record. Another end of the cleaner body includes a second indicator for indicating the proper direction of relative movement between the cleaner and the record during the cleaning so that the stiffer brush precedes the softer brush.

Snap connections preferably secure the upper and lower members of the cleaner body to each other. Between its plie covered projections the lower member includes a pair of elongated openings through which the brushes project downwardly in spaced relationship to the projections and each other. Retainers on the brushes limit their downward movement within the openings and a retaining member secured to the lower member by snap connections engages the brushes to limit their upward movement within the openings. The ends of the brushes are thus properly located relative to ends of the projections which slidably engage the record so that the brush bristles extend into the record grooves sufficiently to provide good cleaning but not so far as to damage the sound track bumps of the grooves.

During periods of nonuse, a receptacle mounts the cleaner body with an upwardly opening depression of the receptacle receiving the pile covered projections and the brushes. One end of the receptacle includes an additional pair of despressions that receive a cleaning fluid bottle and an applicator brush for applying cleaning fluid to the pile coverings of the projections. The cleaning fluid on the pile coverings of the projections helps in removing static electricity from the record during cleaning. Between uses, the cleaning fluid dampness on the pile coverings of the projections is maintained with the projections received in the receptacle depression.

The objects, features, and advantages of the present invention are readily apparent from the following detailed description of the preferred embodiment taken in connection with the accompanying drawings.

BRIEF DESCRIPTION OF THE DRAWINGS

FIG. 3 is a bottom plan view of the cleaner taken along line 3—3 of FIG. 2;

FIG. 4 is an end view of the cleaner taken partially in section along line 4—4 of FIG. 2;

FIG. 5 is an end view of the cleaner taken along line 5—5 of FIG. 2 in the opposite direction as FIG. 4;

FIG. 6 is a partial top plan view of a receptacle of the cleaner taken along line 6—6 of FIG. 2; and FIG. 7 is an enlarged view of a portion of FIG. 4.

DETAILED DESCRIPTION OF THE PREFERRED EMBODIMENT

Figure 1:
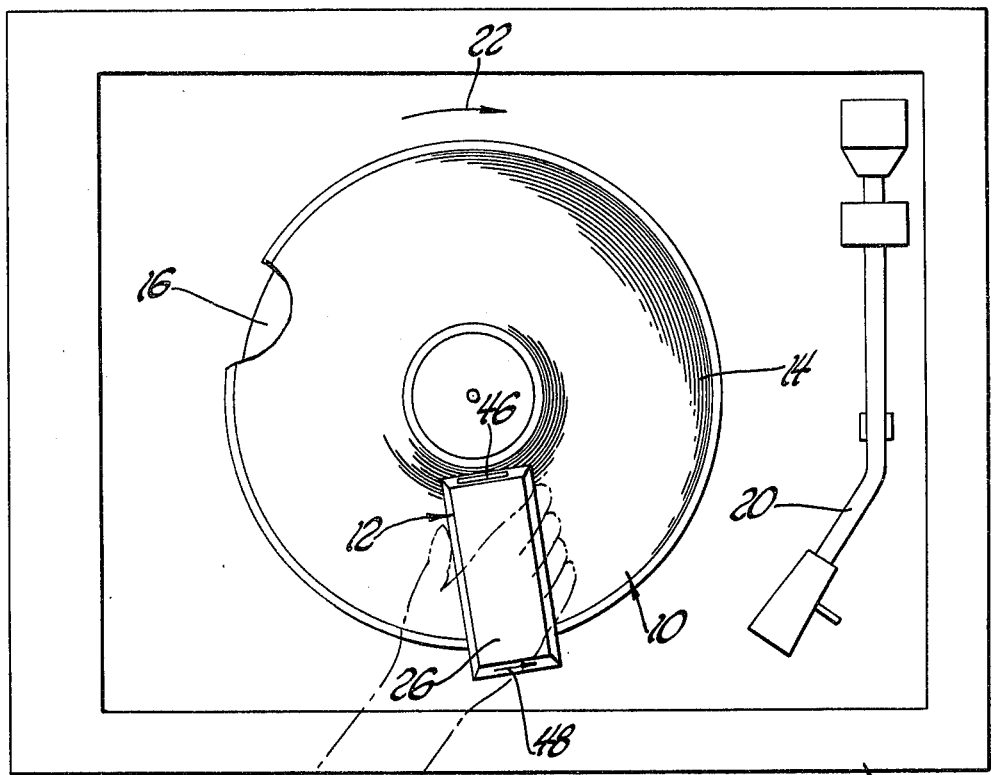
FIG. 1 is a top plan view of a phonograph record turntable having a record thereon that is being cleaned by a cleaner constructed according to the present invention.
Figure 2:
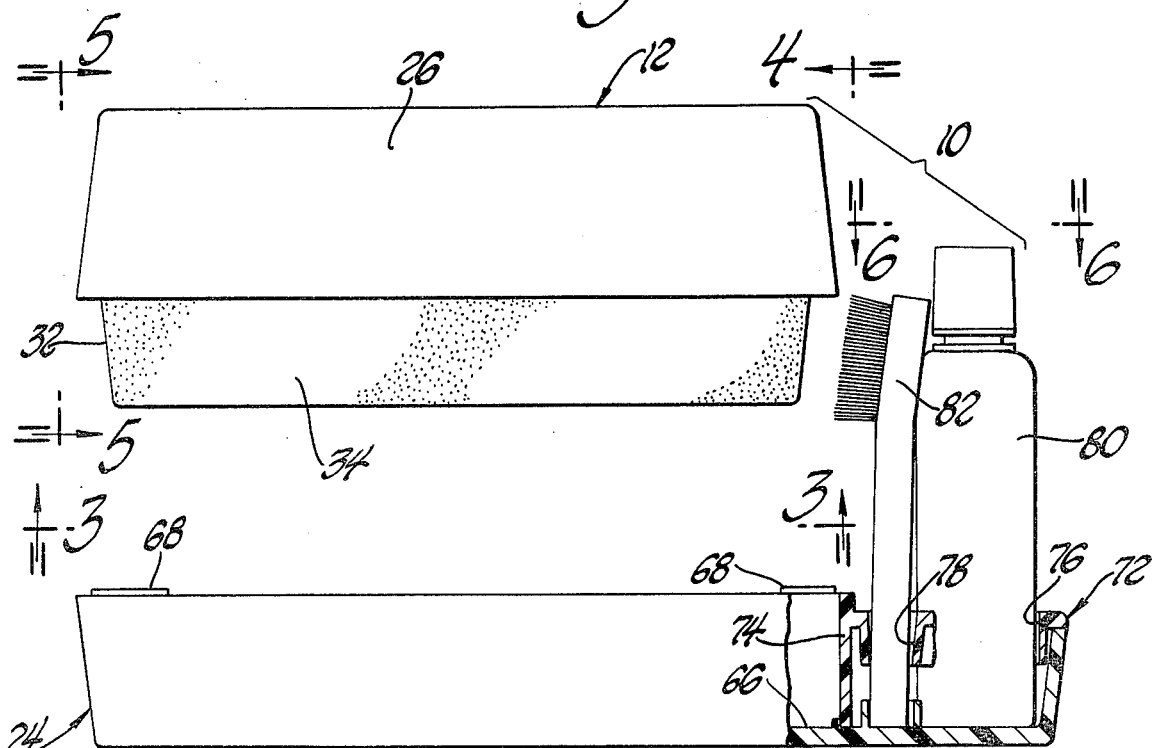
FIG. 2 is a side elevation view of the cleaner partially broken away in section.

Referring to FIGS. 1 and 2 of the drawings, a record cleaner according to the present invention is collectively indicated by reference numeral 10 and includes a cleaner body 12 that is manually grasped and slidably engaged with the phonograph record 14 to clean the sound track grooves of the record. As shown, the record 14 is mounted on the turntable 16 of a turntable assembly 18 whose sensing arm 20 is used to play the record. Rotation of the table 16 in the clockwise direction of arrow 22 allows the cleaning to take place as the cleaner 12 is held stationary with the record moving relative to the cleaner. However, it should be pointed out that the cleaner 12 can also be moved relative to the record as the record is held stationary either on or off the turntable. A receptacle 24 shown in FIG. 2 is used to mount the cleaner body 12 during periods of nonuse in a manner that is hereinafter described in greater detail.

As can be seen by additional reference to FIGS. 3 and 4, cleaner body 12 has an elongated shape and includes an upper member 26 and a lower member 28 that are secured to each other by snap connections 30. Both of the cleaner body members 26 and 28 are made by injection molding plastic with their hollow constructions. Upper member 26 has an outer surface that is manually grasped by a user during cleaning of a record while the lower member 28 has a pair of rigid projections 32 that extend downwardly from the upper member in spaced relationship to each other. Soft pile coverings 34 are secured to the projections 32 in any suitable manner such as adhesive bonding so that the lower flattened ends of the projections can slidably engage the record surface. A pair of brushes 36 and 38 are mounted on the cleaner body extending downwardly between the pile covered projections 32. Brush 36 has bristles 40 that are longer and stiffer than the bristles 42 of the brush 38. Good cleaning action takes place when the stiffer bristled brush 36 precedes the softer bristled brush 38 during relative movement between the cleaner and the record.

As can be seen in FIG. 4, the ends of the brush bristles 40 and 42 terminate along a reference line 44 that extends between the lower extremity of the projection coverings 34. Due to the soft nature of these coverings 34 and a partial collapse thereof as the coverings are engaged with the record, the brush bristles extend into the record grooves a sufficient extent so as to provide proper cleaning action without damaging the sound track in the groove. In the embodiment herein disclosed, the longer bristles 40 have a length of about 9/16 of an inch while the shorter bristles have a length of about ¼ of an inch. Also, the longer bristles have a diameter of approximately four thousandths of an inch while the shorter bristles 42 have a diameter of approximately two thousandths of an inch. Nylon or rayon are suitable materials for the brush bristles 40 and 42 but other materials could also be used. The softer bristles 42 are packed more densely than the stiffer bristles 40, on the order of slightly greater than four times as many bristles per unit area.

As seen by combined reference to FIGS. 4 and 5, the upper member 26 of the cleaner body has opposite ends including indicia for indicating the proper orientation of the cleaner during use. A first indicator 46 on the end shown in FIG. 4 indicates the proper location of the record center with respect to the cleaner during use. If the cleaner is held with this end at the record center with its elongated shape extending radially relative to the record as it is rotated in the normal clockwise direction shown in FIG. 1, the stiffer bristled brush 36 precedes the softer bristled brush 38 in a manner that provides good cleaning action. Likewise, the other end of the cleaner shown in FIG. 5 includes a second indicator in the form of an arrow 48 that indicates the proper direction of relative movement between the cleaner and the record during use. Thus, if the record is held stationary during cleaning and the cleaner is moved, the arrow 48 indicates the proper direction of movement.

As seen by combined reference to FIGS. 3, 4, and 7, the lower member 28 of the cleaner body includes a pair of elongated openings 50 and 52 through which the brushes 36 and 38 respectively project downwardly in spaced relationship to each other and to the projections 32 with the coverings 34 of soft pile. Each brush includes a bristle head 54 that mounts the associated brush bristles in any suitable manner. Bristle heads 54 include retainers in the form of flanges 56 that engage the lower member 28 about the associated openings 50 and 52 to limit the extent of downward brush movement so that the lower ends of the brush bristles are properly located along the line 44 shown in FIG. 4 to clean the record grooves. A retaining member 58 (FIG. 4) injection molded from plastic has side edges 60 secured to the lower member 28 by the snap connections 30 and includes one or more downwardly extending lugs 62 for engaging the bristle heads 54 of the brushes in order to limit upward movement of the brushes within the openings 50 and 52. Brushes 36 and 38 are thus retained against both upward and downward movement in order to properly locate the ends of the brush bristles.

With reference to FIG. 4, assembly of the cleaner is performed by initially inserting the brushes 36 and 38 downwardly through the respective openings 50 and 52 in the lower member 28 of the cleaner body. The retaining member 58 of the cleaner body is then positioned over the lower member 28 so that its side edges 60 engage the inner tapered surfaces of the snap connections 30. Downward pressure applied to the retaining member then forces the outer walls of the projections 32 away from each other until the retaining member edges 60 snap between the inner lugs of the connections in order to provide the securement between the lower member and the retaining member. Subsequently, the upper member 26 of the cleaner body is positioned over the lower member 28 and the secured retaining member 58 and moved downwardly so that retaining flanges 64 at its opposite sides engage the outer tapered surfaces of the snap connections 30. The outer walls of the upper member 26 are then forced away from each other until the flanges 64 snap between the outer lugs of the connections to complete the assembly.

As seen by combined reference to FIGS. 2, 4, and 6, the receptacle 24 is injection molded from plastic and includes an upwardly opening depression 66 in which the pile covered projections 32 and the brushes 36 and 38 of the cleaner body 12 can be received to mount the cleaner body when not being used. Lugs 68 on the upper edges of the receptacle walls and downwardly extending peripheral flanges 70 on the upper member 26 of the cleaner body are interengaged to properly position the cleaner body with respect to the receptacle. One end 72 of the receptacle includes an insert 74 that is secured in position in any suitable manner such as by adhesive bonding. A pair of additional depressions 76 and 78 are defined by the insert 74 and respectively receive a cleaning fluid bottle 80 and an applicator brush 82. Bottle 80 can be removed from the receptacle end to apply cleaning fluid to the pile coverings 34 so as to help in removing static electricity from the record during the cleaning. Applicator brush 82 is utilized to spread the cleaning fluid on the pile coverings 34 after droplets are applied by the bottle 80. Between uses, mounting of the cleaner body on the receptacle 24 within the depression 66 helps in retaining the dampness of this cleaning fluid on the pile coverings 34. Thus, the cleaning fluid does not have to be applied every time the cleaner is used.

While a preferred embodiment of the cleaner constructed according to the present invention has herein been described in detail, those familiar with this art will recognize various alternatives, designs and embodiments for practicing the present invention as defined by the following claims.

The embodiments of the invention in which an exclusive property or privilege is claimed are defined as follows:

1. A phonograph record cleaner comprising: a body having a pair of rigid projections extending downwardly in spaced relationship to each other; said rigid projections having lower ends spaced from each other; soft pile coverings on the projection ends for slidably engaging a record being cleaned; a pair of brushes mounted by the body extending downwardly between the projections; each brush having bristles for loosening dust and accumulation in the grooves of the record and being located closer to one of the projections than the other projection; the bristles of one brush being stiffer than the bristles of the other brush; and the bristles of both brushes extending downwardly and terminating at a common plane extending between the soft pile coverings on the lower ends of the rigid projections whereby the pile coverings collapse upon engagement with a record so that the bristles of both brushes extend into the record grooves a sufficient extent to provide cleaning action in cooperation with the pile coverings without damaging the record grooves.

2. A phonograph record cleaner comprising: a body having a pair of rigid projections extending downwardly in spaced relationship to each other; soft pile coverings on the projections for slidably engaging a record being cleaned; a pair of brushes mounted by the body extending downwardly between the projections; and each brush having bristles for loosening dust and accumulation in the grooves of the record and being located closer to one of the projections than the other projection, the bristles of one brush being stiffer than the bristles of the other brush, the stiffer bristles of the one brush being longer than the softer bristles of the other brush, and the softer bristles of the shorter length being more densely packed than the stiffer bristles.

3. A record cleaner as in claim 2 wherein the body includes an upper surface that is manually grasped to hold the cleaner during use, and indicia for indicating the proper orientation of the cleaner during use so that the stiffer bristled brush precedes the softer bristled brush during movement over the record being cleaned.

4. A record cleaner as in claim 3 wherein the body has an elongated shape intended to extend radially relative to the record during cleaning, the indicia including a first indicator on one end of the body for indicating the location of the record center relative to the cleaner during use, and the indicia including a second indicator on the other end of the body for indicating the direction of relative movement between the cleaner and the record during use.

5. A cleaner as in claim 1 wherein the body has a hollow construction and includes a lower member that defines the projections, an upper member that is manually grasped to hold the cleaner during use, and snap connections that retain the upper and lower members to each other.

6. A cleaner as in claim 5 wherein the lower member includes a pair of openings through which the brushes project downwardly between the projections, each brush having a retainer that limits the downward movement thereof through the associated opening, and retaining means on one of the members for engaging the brushes to limit upward movement of the brushes.

7. A cleaner as in claim 6 wherein the retaining means includes a retaining member, and snap connections that mount the retaining member on the lower member.

8. A cleaner as in claim 5 further including a receptacle for mounting the cleaner body during periods of nonuse, and the receptacle having an upwardly opening depression that receives the pile covered projections and the brushes upon mounting of the cleaner body on the receptacle.

9. A cleaner as in claim 8 wherein the receptacle includes an end with an additional pair of depressions, and a bottle for cleaning fluid and an applicator brush for applying the cleaning fluid to the pile coverings of the projections, the bottle and applicator brush being respectively received within the depressions of the receptacle end.

10. A hand held cleaner for phonograph records, the cleaner comprising: a body having an elongated shape with an upper surface that is manually grasped during use and a pair of rigid projections extending downwardly in spaced relationship to each other; soft pile coverings on the projections for slidably engaging a record being cleaned; a pair of elongated brushes extending downwardly between the projections in spaced relationship to the projections and each other; each brush having bristles for loosening dust and accumulation in the grooves of the record and being located closer to one of the projections than the other projection; one of the brushes having bristles that are longer and stiffer than the bristles of the other brush; and the other brush having the softer and shorter bristles thereof more densely packed than the more rigid longer bristles.

11. A hand held record cleaner for phonograph records, the cleaner comprising: a hollow body of an elongated shape including upper and lower members and snap connections that secure the members to each other; the upper member having an outer surface that is manually grasped during use and the lower member having a pair of rigid projections extending downwardly in spaced relationship to each other; soft pile coverings on the projections for slidably engaging a record being cleaned; a pair of elongated brushes extending downwardly between the projections in spaced relationship to the projections and each other; each brush having bristles for loosening dust and accumulation in the grooves of the record and being located closer to one of the projections than the other projection; one of the brushes having bristles that are longer and stiffer than the bristles of the other brush; the other brush having the softer and shorter bristles thereof more densely packed than the more rigid longer bristles; indicia on the cleaner body for indicating the proper orientation of the cleaner during use so that the stiffer bristled brush precedes the softer bristled brush during relative movement between the cleaner and a record being cleaned; and a receptacle for mounting the cleaner body during periods of nonuse and including an upwardly opening depression that receives the pile covered projections and the brushes when the cleaner body is mounted by the receptacle.

12. A hand held record cleaner for phonograph records, the cleaner comprising: a hollow body of an elongated shape including upper and lower members and snap connections that secure the members to each other; the upper member having an outer surface that is manually grasped during use and the lower member having a pair of rigid projections extending downwardly in spaced relationship to each other; soft pile coverings on the projections for slidably engaging a record being cleaned; a pair of elongated openings in the lower member between the projections; a pair of elongated brushes projecting downwardly respectively through the openings in spaced relationship to the projections and each other; each brush having bristles for loosening dust and accumulation in the grooves of the record and being located closer to one of the projections than the other projection; a retainer on each brush for limiting downward movement thereof through the associated opening; a retaining member having snap connections providing securement thereof to the lower member and being engaged with the brushes to limit upward movement thereof; one of the brushes having bristles that are longer and stiffer than the bristles of the other brush; the other brush having the softer and shorter bristles thereof more densely packed than the longer and stiffer bristles; and a receptacle for mounting the cleaner body during periods of nonuse and having an upwardly opening depression that receives the pile covered projections and the brushes when the cleaner body is mounted by the receptacle.

13. A record cleaner as in claim 12 wherein the body includes indicia for indicating the proper orientation of the cleaner during use so that the stiffer bristled brush precedes the softer bristled brush during relative movement between the cleaner and the record, the receptacle including an end with a pair of additional depressions, and a cleaning fluid bottle and an applicator brush for applying cleaning fluid to the projection coverings, the bottle and applicator brush being mounted within the end depressions of the receptacle when not being used.

14. A hand held record cleaner for phonograph records, the cleaner comprising: a hollow body of an elongated shape including upper and lower members and snap connections that secure the members to each other; the upper member having an outer surface that is manually grasped during use and the lower member having a pair of rigid hollow projections extending downwardly in spaced relationship to each other; soft pile coverings on the projections for slidably engaging a record being cleaned; a pair of elongated openings in the lower member between the projections; a pair of elongated brushes projecting downwardly respectively through the openings in spaced relationship to the projections and each other; each brush having bristles for loosening dust and accumulation in the grooves of the record and being located closer to one of the projections than the other projection; a retainer on each brush for limiting downward movement thereof through the associated opening; a retaining member having snap connections providing securement thereof to the lower member and being engaged with the brushes to limit upward movement thereof; one of the brushes having bristles that are longer and stiffer than the bristles of the other brush; the other brush having the softer and shorter bristles thereof more densely packed than the longer and stiffer bristles; indicia on the body for indicating the proper orientation of the cleaner during use so that the stiffer bristled brush precedes the softer bristled brush during movement over a record being cleaned; the indicia including a first indicator on one end of the body for indicating the location of the record center relative to the cleaner during use; the indicia also including a second indicator on the other end of the body for indicating the direction of relative movement between the cleaner and the record during cleaning; a receptacle for mounting the cleaner body during periods of nonuse; the receptacle having an upwardly opening depression that receives the pile covered projections and the brushes when the cleaner body is mounted by the receptacle; the receptacle also including an end with a pair of additional depressions; a cleaning fluid bottle for applying cleaning fluid to the projection coverings and being receivable within one of the depressions in the receptacle end when not being used; and an applicator brush for spreading the cleaning fluid on the coverings and being receivable in the other depression in the receptacle end when not being used.

* * * * *